Oct. 27, 1931.  E. T. FERNGREN  1,829,641
DOWNFLOW SHEET DRAWING APPARATUS
Original Filed Oct. 29, 1924
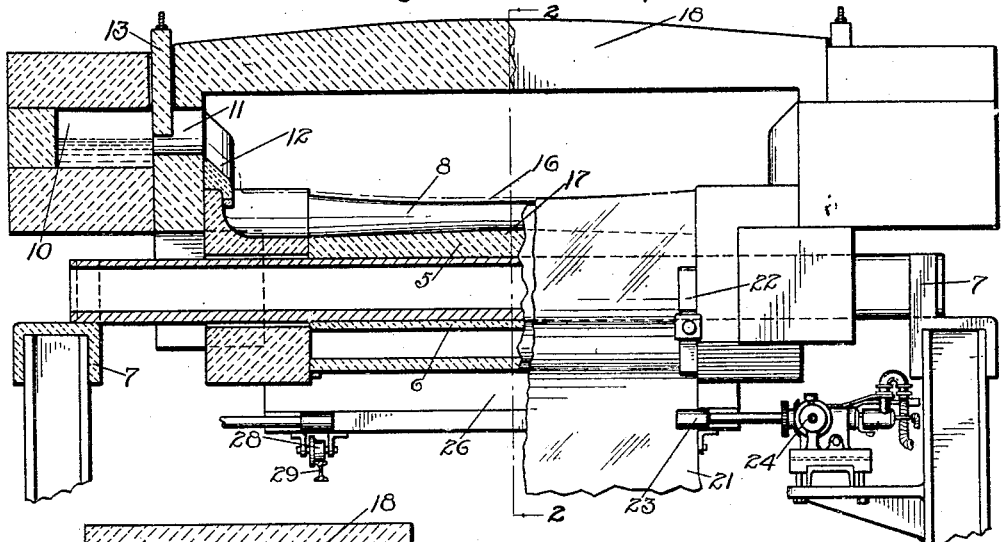
INVENTOR.
Enoch T. Ferngren.
Frank Fraser
ATTORNEY.

Patented Oct. 27, 1931

1,829,641

UNITED STATES PATENT OFFICE

ENOCH T. FERNGREN, OF TOLEDO, OHIO, ASSIGNOR TO THE LIBBEY-OWENS-FORD GLASS COMPANY, OF TOLEDO, OHIO, A CORPORATION OF OHIO

DOWNFLOW SHEET DRAWING APPARATUS

Application filed October 29, 1924, Serial No. 746,655. Renewed October 16, 1929.

The present invention relates to the process and apparatus for drawing sheet glass, and has particularly reference to a so-called down flow apparatus where the streams of glass comprising the finished sheets are flowed down the sides of a suitable slab.

An object of this invention is to provide an apparatus of this nature wherein a stream of glass is flowed down opposite sides of a suitable slab having preferably converging sides, the said slab having means to intercept the downward flow of the streams to build up a reservoir from which a uniform stream flows, after which the streams merge at the end of the slab and are drawn therefrom in united sheet form.

A further object of the invention is to provide a sheet drawing apparatus of this nature wherein a stream of plastic glass is flowed down opposite sides of a slab having convergent sides and including means wherein the flow of the streams is so controlled that the temperature and thickness properties of the streams can be controlled to produce a uniform sheet of glass.

Still another object of the invention is to provide a sheet drawing apparatus of this type wherein a stream of glass is flowed down opposite sides of a slab having convergent sides and having means associated with the slab to form suitable edges of sufficient stability to hold the sheet to width after it has left the slab.

Other objects and advantages of the invention will become apparent during the course of the following description.

In the drawings wherein like numerals are employed to designate like parts throughout the same.

Fig. 1 is a side elevation, partly in section, of the apparatus in use,

Fig. 2 is a section taken substantially on line 2—2 of Fig. 1.

Fig. 3 is a sectional view of a slightly modified construction.

Fig. 4 is a top plan view of the apparatus, and

Fig. 5 is a detail sectional view of one of the cooling shoes.

In the drawings wherein for the purposes of illustration is shown the preferred embodiment of the invention, the numeral 5 designates an adhesion block or slab which is preferably formed from a refractory material, although it can be formed from a heat-resisting metal such as nichrome, monel, etc. The slab 5 is supported by the member 6 which rests upon the supports 7 at the sides of the machine. The upper end of the slab 5 is hollowed out to form a trough 8 in which is disposed during the operation of the machine a quantity of molten glass 9. The molten glass 9 is introduced within the trough 8 by means of suitable conduits 10 which communicate with an opening 11 having a runway 12 which is disposed at each end of the trough 8. The amount of glass allowed to pass through the opening 11 is controlled by means of suitable gates or valves 13. The glass flows from the furnace chamber 14 through the conduits 10, which, as shown in Fig. 4, are arranged at both sides of the slab 5. In this manner a quantity of glass is introduced within the trough 8 at both ends of the slab. The glass is continuously fed into the trough 8 so that an overflow takes place, and streams of glass 15 flow down both sides of the slab. In order to get a substantially uniform overflow, the side walls of the trough 8 are curved as at 16, while the bottom of the trough is arched as at 17, thus producing a more shallow depth of glass in the trough at the center thereof than at the ends. The object of this arrangement is to gradually reduce the depth of the glass body towards the central portion of the trough for the purpose of reducing the heat volume contained so that the glass at this point will not become hotter and more fluent by reason of its position within the heating enclosure 18. By having the side walls of the trough 16 slightly lower in the center an accurate overflow will be had at the central portion of the block. This overcomes the retarding influence of the inner walls of the trough in the slab.

In order to compensate for any irregularities in the overflow of the glass down the sides of the slab as regards the comparative temperatures of various points along the streams and the thickness of the sheet, I form on the slab, preferably near its lower edge thereof, transversely arranged projections 19 which preferably extend throughout the entire width of the slab. The projections 19 in reality form a ledge which has a tendency to intercept and retard the down flow of glass on the sides of the slab, thus forming what is termed a reservoir 20 from which the final flow of glass comes. The source of glass forming the reservoir will have a tendency to spread out along the projections 19, thus equalizing the various temperature conditions of the glass and also permitting a uniform thickness of stream to flow from the reservoir with the result that the two streams merging at the lower end of the slab will be uniform in thickness, thus producing a sheet 21 which will practically have a uniform thickness throughout its entire length and width.

To overcome the natural tendency of the sheet to narrow after it leaves the ends of the slab, I employ shoes 22 arranged at both edges of the streams flowing down the slab which may be hollow and water cooled if desired. The shoes 22 cool the border sections of the streams sufficiently that when the sheet leaves the lower end of the slab they will be rigid enough to overcome the natural tendency of the sheet to narrow. A pair of smooth or knurled rollers 23 may be arranged below the slab to engage with the border portions of the sheet to hold the same to width. The rollers 23 are mounted upon a suitable carriage and driving mechanism 24. The shoes 22 may or may not be used in conjunction with the rollers, as desired. The heating enclosure 18 is preferably provided with a lining 25 formed from a refractory material. The heating enclosure 18 is of such a nature that it is possible to have uniform temperature conditions therein, thus aiding in the formation of the sheet being drawn. The lower end of the enclosure 18 is closed by means of a sectional movable wall 26. Each section is mounted upon a base 27 which may have rollers 28 movable on a rail 29. In this manner the sections can be moved to or from the sheet, thus making it possible to accurately control temperature conditions for the purposes set forth. As shown in Fig. 2, the shoes 22 are carried upon a shaft 30 passing through an opening formed in the block 26. A thumb screw 31 is provided to hold the shaft 30 in the desired adjustment. Each shaft 30 is preferably hollow as illustrated in Fig. 5 and has arranged therein a relatively smaller pipe 30'. The water or other cooling medium is caused to enter through the pipe 30' and, after circulating through the shoe 22, passes outwardly thereof through the space between the pipe 30' and shaft 30.

In Fig. 3, a plain block 32 is used, at the edges of which are arranged the shoes 22 for controlling the temperature of the border portions of the streams being flowed down the slab so the sheet will not narrow after it leaves the end of the slab.

In the foregoing it will be seen that I form a sheet of glass by flowing a stream of plastic glass down both sides of a slab, and utilize means on the slab for retarding the down flow for the purpose of building up a reservoir. The function of the reservoir is to make it possible to control and equalize the temperature conditions throughout the entire width of the streams and also to make uniform the thickness of the stream after it leaves the reservoir. In this manner the streams, when merging at the lower end of the slab, will have a substantially uniform thickness, thus producing a smooth uniform sheet of glass.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In the art of drawing sheet glass, a slab, means to flow a stream of glass down both sides of the slab, and means carried by each side of the slab to build up a reservoir from which flows a uniform stream of glass, the two streams merging at the end of the slab from where they are drawn in sheet form.

2. In the art of drawing sheet glass, a slab, having downwardly convergent sides, means to flow glass down both sides of the slab and to draw the streams from the slab in sheet form, and means projecting outwardly from the slab to build up a reservoir of glass between its introduction to the slab and the point where it is drawn from the slab to produce a smooth uniform sheet of glass.

3. In the art of drawing sheet glass, a slab, means to flow a stream of glass down both sides of the slab and to draw the same therefrom in sheet form, and means on the slab to control the flow of glass from the sides of the slab.

4. In the art of drawing sheet glass, a slab, means to flow a stream of glass down both sides of the slab, and means on the slab for intercepting the flow of glass down the slab to build up a reservoir for equalizing the temperature and uniformity of the sheet being drawn.

5. In the art of drawing sheet glass, a slab, means to flow a stream of glass down both sides of the slab, means formed on the slab and transversely thereto for retarding the movement of the glass down the sides of the slab to equalize the same, and means for drawing the streams from the end of the slab in united sheet form.

6. In the art of drawing sheet glass, a slab, means to flow a stream of glass down both sides of the slab, an enlarged portion formed on the slab between its ends and arranged transversely thereof for retarding movement of the streams to build up reservoirs for equalizing the temperature and uniformity of the streams, and means for drawing the streams from the end of the slab in united sheet form.

7. In the art of drawing sheet glass, a slab having downwardly convergent sides, said slab having a trough formed in its upper end for the reception of a continuous feed of molten glass from where it overflows and passes down the sides of the slab in stream-like formation, means formed on the slab and arranged transversely thereof for retarding the downflow of glass to build up a resevoir for equalizing and making uniform the temperature and thickness properties of the streams, and means for drawing the s ream from the slab in united sheet form.

8. A slab for use in sheet glass apparatus having convergent sides and an enlarged portion formed thereon and extending laterally thereof.

9. A slab for use in sheet glass apparatus having downwardly convergent sides and projections formed on both sides of the slab and extending transversely thereof.

10. A slab for use in sheet glass apparatus having downwardly convergent sides, projections formed on both sides thereof and between its ends, said projections being arranged transversely and extending throughout the entire width of the slab.

11. In an apparatus of the class described, a vertically disposed directing member down and from which molten glass flows in sheet form, and means mounted on said member arranged intermediate the top and bottom of the member at one side thereof and extending horizontally throughout the major portion of its width for coaction with the glass flowing down the same to regulate the thickness of the glass stream throughout i s width, said means projecting outwardly beyond the sides of the body of said directing member.

12. In an apparatus of the class described, a vertically disposed directing member down and from which molten glass flows in sheet form, the opposite sides of which member taper inwardly toward the lower end thereof, and horizontally disposed glass controlling means arranged at opposite sides of said member and integral therewith and extending horizontally substantially throughout the width of the respective sheets, said glass controlling means projecting outwardly beyond the sides of the body of said directing member.

13. In the art of drawing sheet glass, a slab, means to flow a stream of glass down both sides of the slab and to draw the streams from the slab in sheet form, and means on the slab to retard the movement of the streams during their flow down the sides of the slab, said last mentioned means projecting outwardly beyond the sides of the body of said slab.

14. In the art of drawing sheet glass, a slab, means to flow a stream of glass down both sides of the slab, at the end of which they merge and are drawn from the slab in sheet form, and means on the slab to build up a reservoir of glass on both sides of the slab to create a constant uniform flow at a point just prior to the merging of the streams to produce a uniform sheet of glass, said last mentioned means projecting outwardly beyond the sides of the body of said slab.

15. In the art of drawing sheet glass, a slab, means to flow a stream of glass down both sides of the slab and to draw the same therefrom in sheet form, a projection arranged transversely along both sides of the slab for re arding movement of the glass down the sides of the slab.

16. In the art of drawing sheet glass, a slab having downwardly convergent sides, said slab having a glass receiving trough in its upper portion, means for continuously introducing molten glass into the trough where it overflows the sides and flows down the sides of the slab in stream-like formation, means fixed to the slab and projecting outwardly beyond the sides of the body thereof for retarding the flow of glass down the sides of the slab for controlling temperature and thickness properties of the streams, and means for drawing the streams from the end of the slab in united sheet form.

17. In the art of drawing sheet glass, a slab, means to flow a stream of glass down both sides of the slab, means on the slab and projecting outwardly beyond the sides of the body thereof for retarding the movement of the glass down the slab to control and equalize the thickness and temperature properties of the glass, and means for creating an edge on the streams sufficient to maintain the sheet to width after it leaves said slab.

18. A slab for use in sheet glass apparatus, having a chamber in its top, and converging sides with an enlarged portion formed thereon and extending laterally thereof.

19. In apparatus for producing sheet glass, a substantially vertically positioned slab having a glass receiving trough in its upper portion, means for introducing molten glass into the trough where it overflows and flows down the sides of the slab in stream-like formation, and means for drawing the streams from the lower end of the slab in united sheet form, the side walls of said trough being curved and the bottom of said trough being arched to produce a more shallow depth of glass in the trough at the center than at its ends.

20. In apparatus for producing sheet glass, a substantially vertically positioned slab having a glass receiving trough in its upper portion, means for introducing molten glass into the trough where it overflows and flows down the sides of the slab in stream-like formation, means for drawing the streams from the lower end of the slab in united sheet form, means fixed to the slab and projecting outwardly beyond the sides of the body thereof for retarding the flow of glass down the sides of the slab, the side walls of said trough being curved and the bottom of said trough being arched to produce a more shallow depth of glass in the trough at the center than at its ends.

21. In apparatus for producing sheet glass, a substantially vertically positioned slab having downwardly convergent sides, means for flowing molten glass in stream-like formation down the sides of the slab, means for drawing the streams from the lower end of the slab in united sheet form, shoes positioned opposite the edge portions of the streams flowing down said slab, and means for internally cooling said shoes to effect a cooling of the edge portions of the glass streams.

22. In apparatus for producing sheet glass, a substantially vertically positioned slab having downwardly convergent sides, means for flowing molten glass in stream-like formation down the sides of the slab, means for drawing the streams from the lower end of the slab in united sheet form, shoes positioned opposite the edge portions of the streams flowing down said slab, means for internally cooling said shoes to effect a cooling of the edge portions of the glass streams, and means for adjusting said shoes toward and away from the slab and for maintaining them in desired adjusted position.

23. In apparatus for forming sheet glass, a slab provided with a chamber at its top and with downwardly converging sides, an enlarged portion formed on the converging sides and extending transversely thereof, and means for establishing a flow of glass to the chamber formed in the slab and thence downwardly along the sides of the slab and upon the enlarged portion and thence to the bottom edge of the slab where the flowing glass unites into single sheet form.

Signed at Toledo, in the county of Lucas, and State of Ohio, this 27th day of October, 1924.

ENOCH T. FERNGREN.